Figure 1:
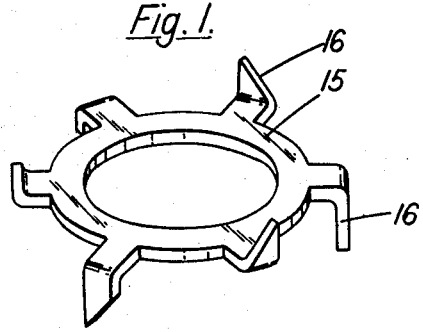

March 30, 1965  A. DISLEY  3,175,462

EXPANSIBLE FASTENER WITH LOCKING WASHER

Filed Oct. 12, 1962

Inventor

AUBREY DISLEY
By Kurt Kelman
agent

United States Patent Office 3,175,462
Patented Mar. 30, 1965

3,175,462
EXPANSIBLE FASTENER WITH LOCKING WASHER
Aubrey Disley, Knowle, England, assignor, by mesne assignments, to G.K.N. Screws & Fasteners Limited, Birmingham, England
Filed Oct. 12, 1962, Ser. No. 230,121
Claims priority, application Great Britain, Oct. 21, 1961, 37,809/61
1 Claim. (Cl. 85—70)

This invention relates to a fastening device of the type which comprises a sleeve formed of a suitable plastics material having at one end a flange, the sleeve being inserted in a prepared hole in a member to which it is desired to attach something with the flange located up against one face of the member, and such sleeve having an axial hole extending therethrough the internal diameter of which, at the end remote from the flange is less than over the remainder of the hole so that when a securing screw is driven into the sleeve from the flanged end it passes with clearance through the axial hole until it engages the portion of reduced internal diameter into which it screws to cause the end of the sleeve to be pulled towards the flange, thus causing the wall of the sleeve to be expanded or bulged radially outwards so as to thereby prevent withdrawal of the sleeve and securely lock it in position in the member and provide a firm anchorage for the securing screw.

In order to avoid having to hold the sleeve against rotation when the screw is being driven in, it is desirable to provide some means which will prevent this possibility of rotation and when being used in metal members such as sheets or plates, this can be obtained by providing a square hole in the metal member and having a square cross section portion on the sleeve so that the engagement between the two is non-rotative. There is no great difficulty in providing square holes in metal members particularly where these are pre-fabricated but when dealing with other material such as plastics, hardboard, wood, glass, or like relatively soft or brittle materials as compared with metal, it is difficult to satisfactorily provide a square hole. This difficulty is even more pronounced where the member is actually in situ, such as a wall panel or the like, and in such cases the provision of a square hole is not a practical proposition.

It is an object of the present invention to provide an improved fastener of this type which is particularly adapted for use in such relatively soft or brittle materials as referred to above.

According to the invention there is provided a fastener of the type above specified wherein a locking member of metal is located underneath the flange at the one end of the sleeve and is non-rotatable in relation to the sleeve, the said locking member having, on its side remote from the flange, one or more relatively sharp projections which can be driven into the material of the member in which the sleeve is mounted to positively lock the sleeve against rotation relative to said member.

For example, the locking member may be in the form of a flat washer having a number of spikes projecting outwardly from its face which is remote from the flange when the washer is located beneath the flange and conveniently such spikes may be pressed out from the metal of the washer.

As the sleeve is formed of a suitable plastics material (e.g. nylon), the locking member in the form of a flat washer with spikes may be conveniently secured beneath the flange by providing similar spikes on the other face of the washer, such spikes being driven into the material of the flange to lock the washer in position.

In the production of such a fastening device where the sleeve is moulded in a suitable plastics material, the washer having projecting spikes on both faces may be attached to the underneath of the flange as a final step in the production of the fastener so as to provide what is in effect a one-piece article and thus avoiding the disadvantage of an operator having to handle two separate articles, namely, sleeve and locking member, when the fastening device is put into use.

Figure 2:
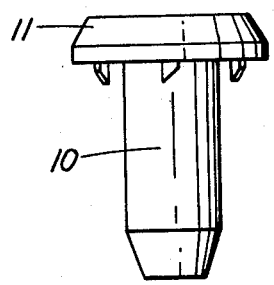
Figure 3:
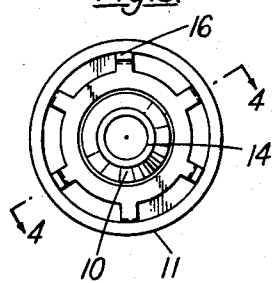
Figure 4:
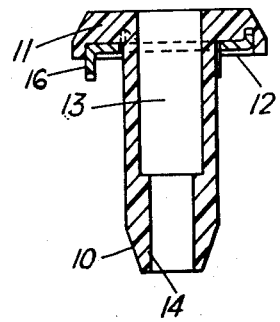

The invention is illustrated in the accompanying drawings wherein:

FIGURE 1 is a perspective view of the locking member drawn on an enlarged scale.
FIGURE 2 is a side view of the device with the locking member assembled on the sleeve.
FIGURE 3 is an underneath plan view of FIGURE 2.
FIGURE 4 is a section on the line 4—4 of FIGURE 3.

In the embodiment of the invention shown in the drawings there is provided a fastening device of the type specified in which the sleeve 10 is of cylindrical form and is expanded by the application of axial compression to cause radial expansion or bulging of the sleeve.

The device may conveniently be manufactured from a suitable nylon by moulding and at one end the sleeve is formed with a circular flange 11 which has an annular recess 12 on its underneath face, such recess providing a housing for the locking washer hereinafter referred to.

The sleeve 10 has an axial hole 13 extending from end-to-end thereof and a portion 14 of the sleeve at the end remote from the flange 11 has this axial opening of reduced diameter to co-act with the securing screw in the manner hereinafter referred to.

The locking member (FIGURE 1) takes the form of an apertured washer 15 which has a number of spikes 16 extending out from both faces around its periphery and conveniently the spikes on one face are staggered in relation to the spikes on the other face.

Such washer is slipped over the sleeve 10 so that it locates in the annular recess 12 under the flange 11 and is then pressed or driven so that the projecting spikes 16 on the one face drive into the material of the flange (as shown in FIGURE 4) and securely locate the washer against rotation about the axis of the sleeve.

Thus, there is provided a fastening device of this type with a metal washer fixed underneath the flange and having a number of spikes projecting outwardly from its face which is remote from the flange.

In use a circular hole is prepared in the member to which the sleeve is to be applied and then the sleeve is inserted therein and the flange struck with a suitable tool to cause the spikes on the washer to be driven into the material of the member surrounding the sleeve so as to positively locate the sleeve against any tendency to rotate about its axis when the securing screw is applied.

The article or part which is being mounted in position is then applied against the external face of the flange and the securing screw is passed through such article or part and into the sleeve and is screwed into the portion 14 of the sleeve, which is of reduced internal diameter, thus causing this portion to be drawn axially towards the flange and radially expanding the material of the sleeve so that it forms a bulge of greater diameter than the hole in the member and securely locks the sleeve in position forming a secure anchorage for the screw.

The above described form of fastening device is particularly advantageous in the mounting of articles or parts on panels or the like which may be made of plastics material, wood, hardboard, or like materials, and it will be appreciated that the flange on the sleeve may be of any desired form and may be shaped so that it can be completely hidden and enclosed in between the article or part which is being mounted and the surface upon which such article or part is mounted so that in practice the flange can be completely obscured.

What I claim then is:

A fastener comprising a plastics material sleeve of cylindrical form having at one end a radially extending flange and having an axial hole of circular cross-section extending therethrough, the internal diameter of the hole, at the end portion remote from the flange being less than over the remainder of the hole, said sleeve having a thin, collapsible wall extending unbroken between said flange and said end portion, said flange having on its underside an annular recess surrounding the exterior of the sleeve and a peripheral wall bounding said recess, a locking member captively mounted in said recess, said locking member comprising a washer having a body in the form of a flat annular ring which engages over the exterior of the sleeve and seats in the base of said recess in the flange, said locking member further comprising a number of teeth formed integrally with said ring, each tooth having a portion projecting radially outwards from the periphery of the ring and having a pointed end which is bent at right angles to said radially projecting portion, the pointed ends being alternately projecting in opposite directions around the periphery of said ring, those pointed ends which project towards the flange being driven into the material of the flange to hold the locking member captive in the recess, and the outer surfaces of said pointed ends being in engagement with the interior of said peripheral wall.

References Cited by the Examiner

UNITED STATES PATENTS

| | | |
|---|---|---|
| 1,929,743 | 10/33 | Jarvis et al. |
| 1,982,076 | 11/34 | Spahn _____ 85—50 |
| 2,102,558 | 12/37 | Johnson _____ 151—41.73 |
| 2,179,575 | 11/39 | Hosking _____ 151—35 |
| 2,525,736 | 10/50 | Taylor. |
| 2,815,059 | 12/57 | Fiddler _____ 151—37 |
| 2,887,926 | 5/59 | Edwards _____ 85—70 |
| 2,918,841 | 12/59 | Pouptich. |

FOREIGN PATENTS 13,798   7/05   Great Britain.

EDWARD C. ALLEN, *Primary Examiner.*